United States Patent [19]
Tinklepaugh

[11] Patent Number: 5,947,446
[45] Date of Patent: Sep. 7, 1999

[54] CONTROL VALVE BUSHING WITH ANODIZED ALUMINUM SURFACE WITH TEFLON

[75] Inventor: Mark H. Tinklepaugh, Canastota, N.Y.

[73] Assignee: New York Air Brake Corporation, Watertown, N.Y.

[21] Appl. No.: 08/938,604
[22] Filed: Sep. 26, 1997
[51] Int. Cl.⁶ .................................................. F16K 31/44
[52] U.S. Cl. ............................................ 251/368; 251/214
[58] Field of Search ...................................... 251/368, 214

[56] References Cited

U.S. PATENT DOCUMENTS 3,744,755  7/1973  Gary, Jr. et al. ........................ 251/309
4,453,898  6/1984  Leka et al. ............................... 417/521
5,397,063  3/1995  Weinstein ................................. 239/703

OTHER PUBLICATIONS

AnoLube III, Anoplate Corporation, a circular, Achieving synergy with hard anodize and Teflon.
Product Specifications Alcoa UltrAlloy X6020, Oct. 1996.

*Primary Examiner*—A. Michael Chambers
*Attorney, Agent, or Firm*—Barnes & Thornburg

[57] ABSTRACT

A bushing for a railroad control valve composed of aluminum having an anodized surface with a teflon layer at least where a valve element moves within the bushing. The teflon is preferably impregnated into the anodized surface or may be a continuous teflon sheet bound to the anodized surface.

8 Claims, 3 Drawing Sheets

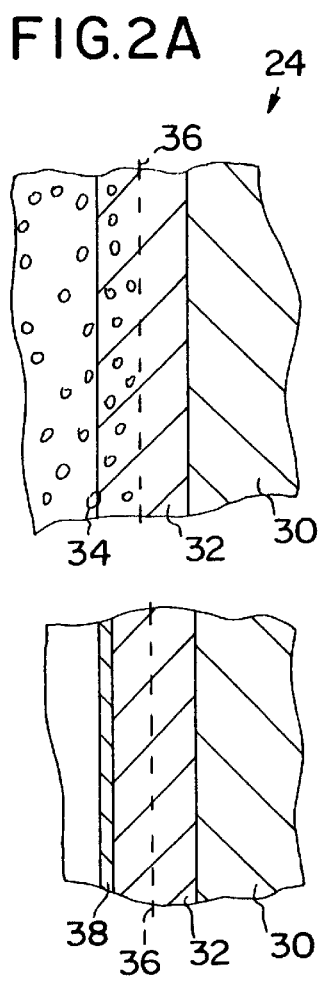
FIG.2A
FIG.2B
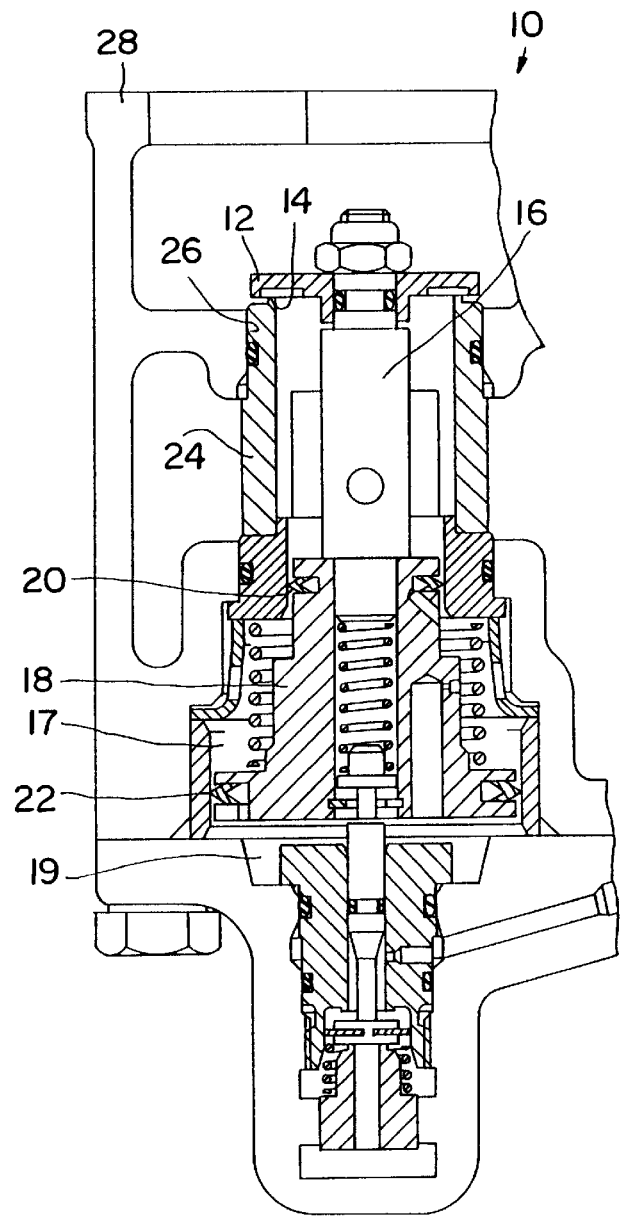
FIG.1

CONTROL VALVE BUSHING WITH ANODIZED ALUMINUM SURFACE WITH TEFLON

BACKGROUND AND SUMMARY OF THE INVENTION

The present invention relates to bushings and more specifically a bushing for railroad equipment.

Bushings for railroad equipment have generally included brass. Other parts that have acted as bushings also include stainless steel. This is because of the severe environment in which railroad equipment operates, for example, extreme temperatures, from the very hot deserts to the very cold north. Bushings are generally used with a valve element generally connected to a piston responsive to differential pressure to open and close the valve. Seals, for example, O-rings and K-rings are provided on the valve element as it moves in the bushing. Lubricant between the bushing and the valve element may be affected by severe temperatures, as well as being diluted by water or solvents inherent in the railroad air system. Also, in certain environments, contaminants, for example, coal dust, score the brass bushing and affect its ability to seal with the O-rings or K-rings. Brass is not inexpensive and adds to the weight of the overall valve.

The present invention provides a bushing for a railroad control valve composed of aluminum having an anodized surface with a teflon layer at least where a valve element moves within the bushing. The teflon is preferably impregnated into the anodized surface or may be a continuous teflon sheet bound to the anodized surface. The anodized surface is a hard coat anodize having a thickness in the range of 0.0006 to 0.001 inches. The valve element includes at least one seal riding on the teflon surface without lubrication. The control valve is a pneumatic brake control valve and the valve element may be part of a piston of a vent valve, an emergency portion or service portion of the control valve.

Other objects, advantages and novel features of the present invention will become apparent from the following detailed description of the invention when considered in conjunction with the accompanying drawings.

BRIEF DESCRIPTION OF THE DRAWINGS

FIG. 1 is a cross-sectional view of a vent valve incorporating the principles of the present invention.

FIGS. 2A and 2B is an enlarged cross-sectional view of a bushing incorporating the principles of the present invention.

DETAILED DESCRIPTION OF THE PREFERRED EMBODIMENTS

Figure 3:
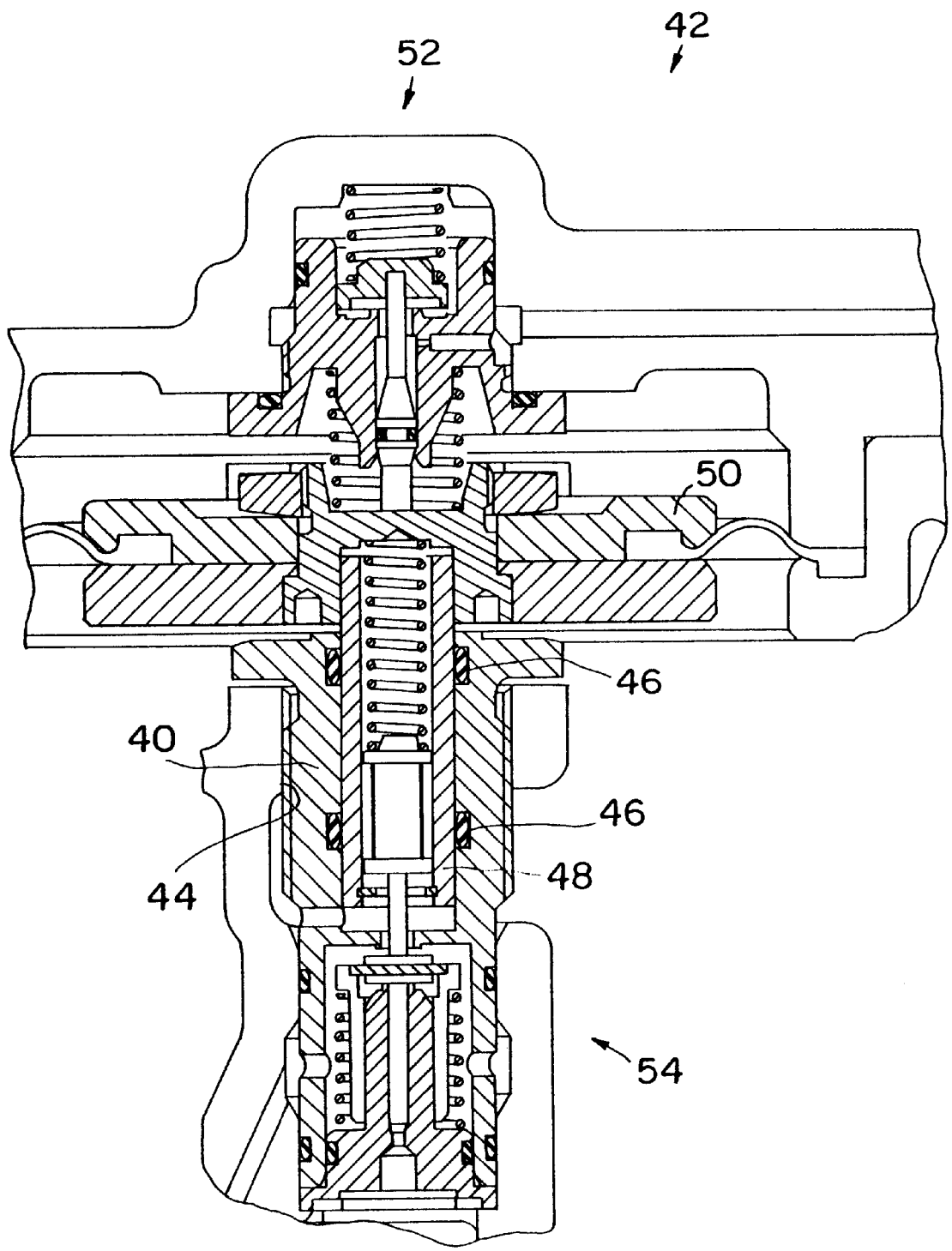
FIG. 3 is a cross-sectional view of an emergency portion of a brake control valve incorporating the principles of the present invention.

A vent valve 10 is shown in FIG. 1 as including a valve disc 12 cooperating with the valve seat 14 for venting a railroad brake control valve to atmosphere in an emergency condition. The valve disc 12 was connected by valve piston stem 16 to piston 18. The piston includes K-rings 20 and 22 in the circumference thereof and rides within bushing 24. The bushing 24 is received in bore 26 of housing 28. The piston 18 is responsive to the differential pressure in chambers 17 and 19 to control the opening of the vent valve 10.

The bushing 24 has historically been made of brass. Early versions of the bushing 24 included four separate bushings wherein the portions of the bushing on which the K-rings 20 and 22 moved were of brass while the remainder was stainless steel or other materials.

An improvement of the present invention is to make bushing 24 as an aluminum bushing having an anodized surface with a teflon coating at least where the valve element moves within the bushing. Thus, with bushing 24 was a single element, the total bushing would be aluminum with at least the interior surface on which the K-rings 20 and 22 ride being anodized and include a teflon layer. If bushing 24 was a plurality of bushings, at least the portions on which the K-rings 20 and 22 ride would have an anodized aluminum surface with a teflon layer.

Details of the surface of the bushing 24 is illustrated in FIGS. 2A and 2B. The bushing generally is an aluminum bushing 30 having an anodized surface 32 with a teflon layer, either shown as particles of teflon 34 embedded in the anodized surface 32 in FIG. 2A or as a teflon sheet or film 38 in FIG. 2B. The aluminum is an aluminum alloy for example, a 6020 aluminum alloy that has a hard coat anodization. Typically, this would include a 0.004 inch build-up and a 0.004 subsurface. The dotted line 36 in FIGS. 2A and 2B indicates an approximation of the location of the separation of the build-up versus the subsurface. Total thickness of the anodized layer 32 would be in the range of 0.0006 to 0.001 inches.

The formation of the anodized surface 32 with teflon particles 34 embedded therein is produced by a process for example, AnoLube III from AnoPlate Corporation, Syracuse, N.Y. Other anodized processes producing embedded teflon particles 34 may be used. With respect to FIG. 2B, the teflon sheet 38 may be applied to the anodized surface 32 after anodization by being sprayed thereon and subsequently baked. This is a well known technique presently used on the ball of an angle cock at New York Air Brake Corporation.

The advantage of the anodized aluminum with the teflon layer over brass is the reduced cost, reduced weight and increase performance and longevity. Also, since aluminum alloy does not contain lead and brass has a relatively high percent of lead, the use of aluminum eliminates lead. The ability to provide teflon in the surface, provides a lubricant for the O-rings and K-rings which will not wash away, or be diluted by water or solvents inherent in the railroad air system. Teflon provides a non-stick, reduced coefficient friction surface which slides against plastic brass, rubber or stainless steel parts. The hard anodized surface 32 also has a scratch resistance greater than the hardest commercially available brasses. This is important due to contaminants for example, coal dust, in some railroad uses. Also, teflon has no viscosity which would be effected by the temperature extremes that railroad equipment is subject to as grease lubricants would be. The anodized aluminum in combination with the teflon provides a high corrosion resistant material.

Other bushings in a brake control valve for example, a DB-60 available from New York Air Brake Corporation, would include bushing 40 in the main stack of the emergency portion 42 as illustrated in FIG. 3. The bushing 40 is received in bore 44 of the emergency portion. A pair of wear rings 46 in the interior bore of bushing 40 receives stem 48 of piston 50. The piston 50 operates the accelerated application sensor valve 52 and the quick action chamber pressure discharge valve 54. The internal bore of bushing 44 has the anodized surface with a teflon layer according to FIGS. 2A or 2B.

Figure 4:
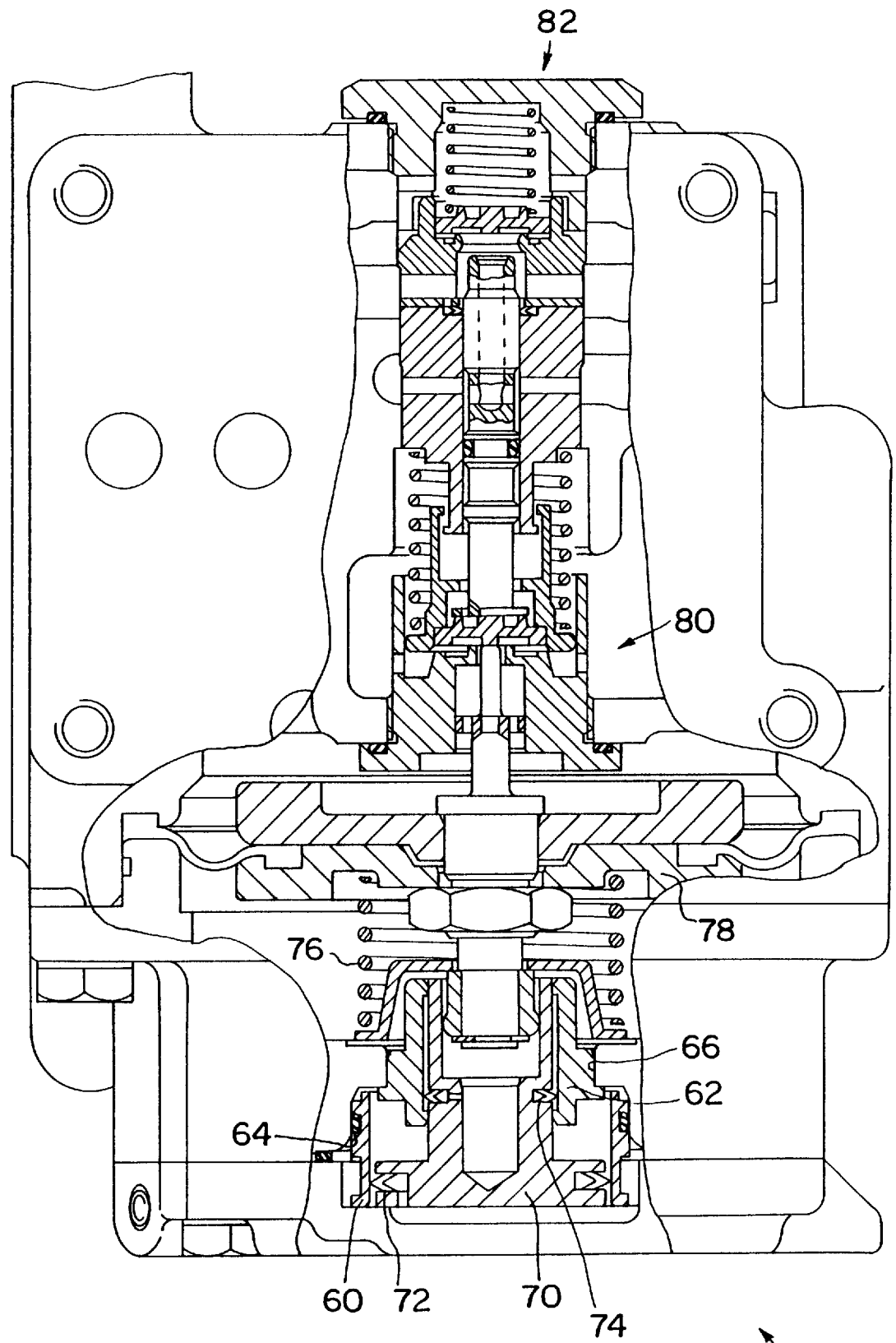
FIG. 4 is a cross-sectional view of a service portion of a brake control valve incorporating the principles of the present invention.

FIG. 4 illustrates bushings 60 and 62 as other candidates for the anodized aluminum bushing having a teflon layer. The bushings 60 and 62 are in bores 64 and 66 of the service portion 68. A piston 70 having K-rings 72 and 74 rides within the bushings 60 and 62. This piston is the balancing piston operating on spring 76 against piston 78. Piston 78 operates a quick service chamber inlet valve 80 and brake cylinder outlet valve and auxiliary reservoir and brake cylinder outlet valve 82.

The anodized aluminum teflon coated bushing of the present invention has been illustrated with respect to the DB-60 brake control valve. These bushings may be used in other brake control valves as well as other valves or accessory equipment within the railroad air system with particular advantage to the bushing which receives the piston or actuator of the valve element.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A pneumatic brake control valve comprising:

a housing;

a bushing in the housing;

a piston and valve element combination moving within the bushing and including at least one seal riding on a surface of the bushing without lubrication;

the bushing being comprised of aluminum having an anodized surface with a Teflon layer at least where the valve element's seal rides.

2. A control valve according to claim 1, wherein the Teflon is impregnated in the anodized surface.

3. A control valve according to claim 1, the anodized surface is hardcoat anodize.

4. A control valve according to claim 1, the anodized surface has a thickness of 0.0006 to 0.001 inches.

5. A control valve according to claim 1, wherein the piston and valve element combination is part of a vent valve.

6. A control valve according to claim 1 wherein the piston and valve element combination is part of an emergency portion of the brake control valve.

7. A control valve according to claim 1, wherein the Teflon is a sprayed on and baked layer.

8. A control valve according to claim 1, wherein the piston and valve element combination is part of a service portion of the brake control valve.

* * * * *